United States Patent

[11] 3,629,063

| [72] | Inventor | John M. Houston |
| | | Schenectady, N.Y. |
| [21] | Appl. No. | 761,453 |
| [22] | Filed | Sept. 23, 1968 |
| [45] | Patented | Dec. 21, 1971 |
| [73] | Assignee | The United States of America as represented by the Secretary of the Air Force |

[54] VENT FOR NUCLEAR-THERMIONIC FUEL ROD
2 Claims, 2 Drawing Figs.

[52] U.S. Cl. ................................................... 176/37, 176/68, 315/4, 165/105, 176/39
[51] Int. Cl. ............................................................. G21c 19/30
[50] Field of Search ............................................ 310/4; 176/39, 37; 165/105

[56] References Cited
UNITED STATES PATENTS

| 3,113,091 | 12/1963 | Rasor et al. | 310/4 |
| 3,259,766 | 7/1966 | Beckjord et al. | 310/4 |
| 3,302,042 | 1/1967 | Grover et al. | 310/4 |
| 3,441,752 | 4/1969 | Grover et al. | 310/4 |
| 3,243,613 | 3/1966 | Grover | 176/39 |

*Primary Examiner*—Reuben Epstein
*Attorneys*—Harry A. Herbert, Jr. and Ruth G. Codier

ABSTRACT: Cesium vapor, ordinarily lost to space, is carried through a venting tube to an area where a lowered temperature causes it to condense onto a wick and to be carried by capillary action back to an area sufficiently high to vaporize it and return it to the Cs vapor region of the fuel rod. The condensing, wicking and evaporation are effected by telescoping sections of a hollow tube. The vapor is conveyed through the tube to a cooler area, is condensed on a wick inside the outer tube and is vaporized from the wick on the outside of the inner tube.

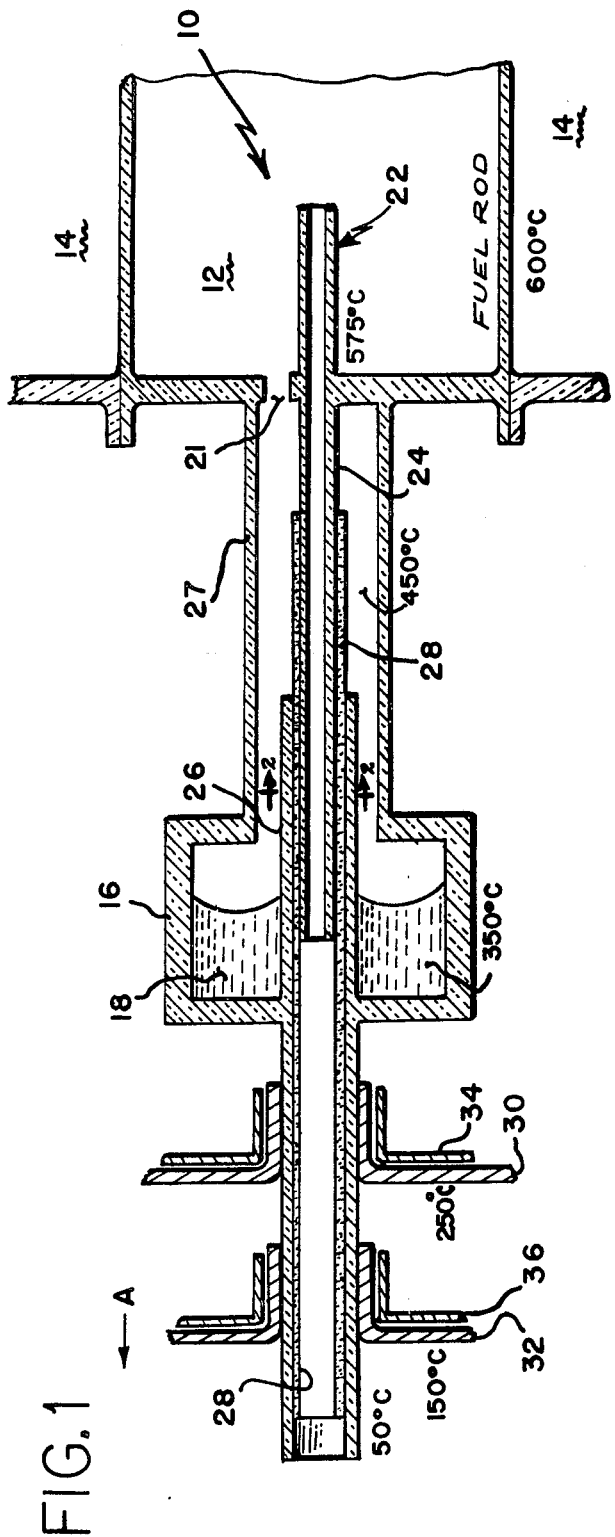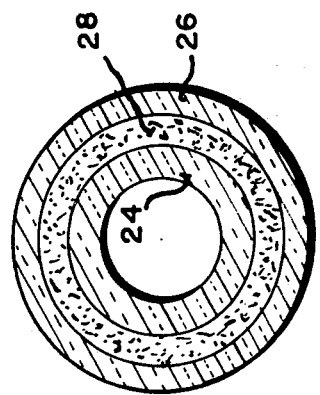

VENT FOR NUCLEAR-THERMIONIC FUEL ROD

BACKGROUND OF THE INVENTION

The invention relates to a method and apparatus for the salvaging of cesium vapor that has heretofore escaped from the fuel rod area of a nuclear reactor and, more particularly, to a method and device which accomplishes this purpose by installing wicking at a relatively cool point adjacent the fuel rod assembly and conducting the condensed vapor back to the storage chamber for the liquid metal.

SUMMARY OF THE INVENTION

The object of the invention is to provide a new method for venting a new type of fission-gas vent for a nuclear-thermionic fuel rod. The novel feature of this vent is that the cesium vapor is condensed and returned by capillary wicking to the interior of the fuel rod instead of escaping into space and being lost for further use as has heretofore been the case.

Electrical space poser sources in which cesium thermionic heat-to-electricity converts are incorporated into a nuclear reactor are now under active development. In one of the most promising geometries, the reactor is made up of a number of cylindrical fuel rods, each rod containing a group of cylindrical thermionic converters with a common Cs vapor envelope.

One problem with such systems are gaseous fission products (e.g., xenon) which are produced by the fission process within the $UO_2$ fuel. At present most of these fission products cannot be retained within the nuclear fuel itself. One can hermetically seal each emitter and contain these gaseous fission products for a short time, e.g., a few hundred hours. However, such space power sources must operate for thousands of hours, and the pressure buildup in a hermetically sealed emitter then becomes excessive. The usual solution proposed for this problem is to vent each emitter into the common Cs vapor region within the fuel rod. This Cs vapor region would, in turn, be vented to space once the space power source was safely in orbit, since otherwise the fission-gas pressure would accumulate in the Cs vapor region and interfere with the operation of the thermionic converters.

The simplest type of vent to use between the Cs vapor region of the fuel rod and the vacuum of space is a simple hole. The size (i.e., the conductance) of this hole must be chosen with care. If the hole is made too large, fission gases are vented efficiently, but too much cesium vapor is also lost out the hole. As a result one must seriously increase overall system weight by greatly increasing the size of the liquid Cs reservoir built into each fuel rod. The useful upper limit on hole size occurs when the hole size is such that about 1,000 Cs atoms flow out the vent hole for each fission gas atom. Since the Cs pressure must be maintained at about 5 Torr for efficient converter operation, this means that the fission gas pressure can only be reduced to a minimum value of about 0.005 Torr by using a simple hole (without unduly increasing system weight).

The present invention involves a vent design in which a much larger conductance is feasible between the Cs vapor region of the fuel rod and the vacuum of space. This allows one to maintain a much lower fission gas pressure in the fuel rod adjacent to the vent. It also increases the ability of the vent to handle transient overloads, as would occur if a burst of fission gases was suddenly released from one emitter into the Cs vapor region of the fuel rod. Such bursts will probably occur because of the nature of the processes by which fission gases are released from the nuclear fuel and from the emitters.

DESCRIPTION OF THE DRAWING

FIG. 1 is a fragmentary longitudinal section of the end of a thermionic fuel rod, and the attached wick device of the invention; and FIG. 2 is a cross section of the telescoping portions of the vent tube taken on the line 2—2 of FIG. 1.

DESCRIPTION OF THE PREFERRED EMBODIMENT

Referring more particularly to the drawing, the end of a nuclear-thermionic fuel rod is shown at 10 in FIG. 1, comprised of cesium vapor region 12, and the liquid metal coolant region 14.

A reservoir 16 for containing liquid cesium metal 18 is attached to the end of the housing of the fuel rod 10. The temperature of the reservoir 16 is adjusted to control the cesium pressure in the fuel rod 10. The conductance between the cesium reservoir 16 and the fuel rod area 10 is controlled by passageways 21 leading from the cesium vapor region 12 of the fuel rod area 10 and communicating with the liquid cesium reservoir 16 so that the pressure in the fuel rod area is essentially equal to that in the reservoir.

The pressure is controlled by control of temperatures of the metal coolant 14 which operates at approximately 600° C. and the temperature of the cesium reservoir 16 which is operated at a temperature of approximately 350° C., which yields the desired cesium pressure of the order of 6 Torr.

A metal vent tube 22 originates in the cesium vapor region 12 of the fuel rod area 10 and passes through the reservoir 16 and terminates in the vacuum of space. The tube 22 comprises an inner metal tube 24, telescoping in the area of the liquid reservoir into a metal tube 26. The liquid reservoir 16, is attached to the housing of the fuel rod 10 by a hollow tube 27, concentric with and surrounding the vent tube 22, thus providing communication through the vent hole 21 between the vapor region 12 of the fuel rod housing and the liquid reservoir.

A wick 28 is composed of several layers of screen or woven cloth fabricated of fine metal wire. In the area where the tubes 24 and 26 telescope, the wick lies between them. This is shown in FIG. 2. The wick 28 surrounds the tube 24, and lines the tube 26.

The wick 28 is capable of transporting liquid metal by capillary action in the small spaces between the fine wires, in a manner comparable to a cloth wick transporting water. The term wick and wicking are used herein as verbs for indicating this movement of liquid under capillary force.

It will be noted that the inner tube 24 extends into the vicinity of the liquid reservoir 16, and is not present in the area further to the left, as shown in the drawing. Similarly, the outer metal tube 26 passes through the reservoir 16 and does not extend much farther.

The radial temperature gradients in the structure are small and unimportant. However, a large temperature gradient exists along the axis. In the area of the vent opening 21, where the vent 22 joins the fuel rod 10, the temperature is near to that of a metal coolant 14 which is of the order of 600° C. In the area of the cesium reservoir, the venting area is at the temperature of the liquid cesium, that is, about 350° C. To the left of the reservoir 16, as the device is oriented in FIG. 1 of the drawing, the vent temperature drops further.

This drop is aided by small black radiating fins 30 and 32, which are fastened to the outside of the tube 26. Two are shown, diminishing in size, but the invention is not limited to this number or design.

The fins 30 and 32 may be heat shielded on their rear surfaces by means of metal foil 34 and 36. This shielding reduces the pickup of radiation from the hotter portions of the system. The fins 30 and 32 are oriented so that they radiate axially to the left, in the direction of the arrows A. This happens because, in an actual system, there are many fuel rods packed closely side by side, and the fins act as shielding for one another adjacent radial radiation.

MODE OF OPERATION

Fission gases and cesium vapor enter the tube 24 from the cesium vapor region 12 of the fuel rod 10, and flow to the left in the direction of the arrow A toward the end of the tube 26 which terminates in the vacuum of space. Some type of cooling means is provided. In the vicinity of the fin 30, the vent temperature has fallen below that of the reservoir 16, causing condensation of most of the cesium vapor onto the wick 28.

The small amount of cesium vapor remaining continues toward the end of the tube 26 but condenses onto the 28 by the cooler temperatures present around the fin 32, and the end area of the tube 26. The fission gases and a small amount of cesium escapes into space. However, most of the cesium is condensed into the wick 28, and is retrieved as follows: first, all the capillary regions in the cooler portions of the wick are filled with liquid cesium. When these are full, additional cesium wicks to the right, moving into the hotter area where the wick passes through telescoped portions of tubes 24 and 26. The temperature in the area of the end of the tube 24 is of the order of 450° C. The liquid cesium evaporates at this temperature. This condensation, wicking and evaporating process thus returns most of the cesium from the opening vent 21 back to the region of the cesium reservoir 16.

The condensation of cesium in the vicinity of the fin 30 delivers heat to the fin 30, the heat of condensation of cesium being about 54 joules/gram in this temperature range.

Although the invention has been described with reference to a particular embodiment, it will be understood to those skilled in the art that the invention is capable of a variety of alternative embodiments within the spirit and scope of the appended claims.

I claim:

1. A device for salvaging cesium vapor usually lost to space from a cesium thermionic fuel rod, said device comprising a first tube originating in the cesium vapor region of a fuel rod, a liquid cesium reservoir, a chamber, surrounding said tube in concentric relationship therewith and providing communication between said liquid reservoir and said vapor region of said fuel rod, said tube leading from the interior of the cesium vapor region of said fuel rod and through said liquid cesium reservoir, said tube telescoping into a second tube in the area of said liquid cesium reservoir, said second tube leading, through the rear of said liquid cesium reservoir to an area of lower temperature, a wick, surrounding said first tube, and serving as a lining for said second tube, said wick positioned between said first tube and said second tube in their telescoping area whereby, by virtue of the temperature gradient along the length of said tubes the escaping vaporized cesium reaches an area of lower temperature and is condensed on the portion of said wick lining said second tube, is then conveyed by capillary force to the area of said wick surrounding said first tube, is then evaporated from said wick and returned to the chamber which communicates with said liquid reservoir.

2. A device for salvaging vapor which device comprises a vent tube comprising telescoping inner and outer portions, the inner portion leading from a vapor region, the outer portion leading to an area of sufficiently lowered temperature to condense said vapor, a wick surrounding said inner tube, lining said outer tube and lying between said inner and outer tubes in their telescoping area, whereby the vapor is conducted through said inner tube to an area of sufficiently lowered temperature to condense said vapor to a liquid condition, and whereby said wick absorbs said vapor in a liquid condition and conveys it by capillary action back to a region of sufficiently high temperature to again vaporize and return it to said vapor region.

* * * * *